United States Patent
Shen et al.

(10) Patent No.: US 9,565,293 B2
(45) Date of Patent: Feb. 7, 2017

(54) METHOD AND DEVICE FOR OPERATING MOBILE TERMINAL BASED ON SENSOR, AND MOBILE TERMINAL

(75) Inventors: Chuangye Shen, Shenzhen (CN); Litian Liu, Shenzhen (CN); Xiaomin Sun, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 14/399,993

(22) PCT Filed: Jul. 16, 2012

(86) PCT No.: PCT/CN2012/078695
§ 371 (c)(1),
(2), (4) Date: Mar. 25, 2015

(87) PCT Pub. No.: WO2013/166778
PCT Pub. Date: Nov. 14, 2013

(65) Prior Publication Data
US 2015/0215441 A1    Jul. 30, 2015

(30) Foreign Application Priority Data

May 9, 2012 (CN) .......................... 2012 1 0142051

(51) Int. Cl.
*H04M 3/00* (2006.01)
*H04M 1/725* (2006.01)
(Continued)

(52) U.S. Cl.
CPC .............. *H04M 1/7258* (2013.01); *G06F 1/32* (2013.01); *G06F 1/3203* (2013.01);
(Continued)

(58) Field of Classification Search
None
See application file for complete search history.

(56) References Cited

U.S. PATENT DOCUMENTS

2002/0173299 A1* 11/2002 Buchholz .......... H04M 1/72522
455/418
2006/0005156 A1* 1/2006 Korpipaa .............. G06F 1/1613
717/100
(Continued)

FOREIGN PATENT DOCUMENTS

CN      101002175 A     7/2007
CN      101101523 A     1/2008
(Continued)

OTHER PUBLICATIONS

International Search Report for corresponding application PCT/CN2012/078695 filed Jul. 16, 2012; Mail date Feb. 28, 2013.
(Continued)

*Primary Examiner* — Vladimir Magloire
*Assistant Examiner* — Shantell L Heiber
(74) *Attorney, Agent, or Firm* — Cantor Colburn LLP (57) ABSTRACT

A method for operating a mobile terminal based on a sensor is disclosed. The method includes: a sensor is triggered according to a preset trigger rule to make the sensor output a digital signal corresponding to the trigger rule; after receiving the digital signal which is corresponding to the trigger rule and is output from the sensor, ab operation type, which is corresponding to the digital signal, of the mobile terminal is determined; and a corresponding operation process is performed on the mobile terminal according to the operation type. The disclosure also provides a corresponding device and a mobile terminal including the device. The method for operating the mobile terminal based on the sensor provided in the disclosure completes power-on/off, wakeup, sleep and other operations on the mobile terminal through the sensor, so as to bring better use experience to a user while making the structure of the mobile terminal simpler.

12 Claims, 6 Drawing Sheets

(51) Int. Cl.
  *H04W 52/02* (2009.01)
  *G06F 1/32* (2006.01)
  *G06F 3/0338* (2013.01)
  *G06F 3/0481* (2013.01)

(52) U.S. Cl.
  CPC .......... *G06F 3/0338* (2013.01); *G06F 3/0481* (2013.01); *H04W 52/0254* (2013.01); *H04W 52/0261* (2013.01); *H04M 2250/12* (2013.01)

(56) References Cited

U.S. PATENT DOCUMENTS

| | | | |
|---|---|---|---|
| 2007/0161400 A1* | 7/2007 | Sharp | G06F 3/0234 455/550.1 |
| 2009/0143103 A1 | 6/2009 | Chishti et al. | |
| 2010/0123664 A1 | 5/2010 | Shin et al. | |
| 2010/0245282 A1* | 9/2010 | Lai | G06F 3/0488 345/174 |
| 2011/0183601 A1* | 7/2011 | Hannon | B60K 35/00 455/1 |
| 2011/0238191 A1* | 9/2011 | Kristjansson | G06F 1/1626 700/94 |
| 2011/0244844 A1 | 10/2011 | Aoike | |
| 2012/0019390 A1* | 1/2012 | Franceschini | H01M 2/1022 340/635 |
| 2012/0306770 A1* | 12/2012 | Moore | G06F 3/01 345/173 |
| 2013/0063611 A1* | 3/2013 | Papakipos | G06F 1/1686 348/207.11 |

FOREIGN PATENT DOCUMENTS

| | | |
|---|---|---|
| CN | 101847055 A | 9/2010 |
| CN | 101937316 A | 1/2011 |
| CN | 102265253 A | 11/2011 |
| WO | 2012054005 A1 | 4/2012 |

OTHER PUBLICATIONS

Supplemental European Search Report issued Apr. 13, 2015 re: Application No. PCT/CN2012/078695; pp. 1-7; citing: WO 2012/054005 A1 and US 2009/143103 A1.

* cited by examiner

METHOD AND DEVICE FOR OPERATING MOBILE TERMINAL BASED ON SENSOR, AND MOBILE TERMINAL

TECHNICAL FIELD

The disclosure relates to the field of communications, and more particularly to a method and device for operating a mobile terminal based on a sensor, and a mobile terminal.

BACKGROUND

With higher and higher requirement of people on function and appearance of a mobile terminal, the appearance and production of a mobile terminal become more and more exquisite. At present, the most obvious change of a mobile terminal is that the past keypad is gradually replaced by a touch screen. However, despite this, the increasing aesthetic demand of a user is not satisfied; therefore, the current manufactured mobile terminal is equipped with as few keys as possible or not equipped with key at all.

Currently, most mobile terminals with touch screen mainly include a home key, a power-on key, several function keys at side of the mobile terminals, and so on. However, these mobile terminals usually start a system through an entity power button; the specific method is that: an entity power button is connected with a Power Management Unit (PMU); the PMU will be triggered after long press of the entity power button, and a Main Control Unit (MCU) is powered through the PMU, so as to maintain normal running of the MCU, thus, to complete start-up of a terminal system; when powering off, it is implemented by long press of the entity power button. But, using an entity power button to power on or off a mobile terminal makes the structure of the mobile terminal not simple enough, and can not bring better use experience to a user.

SUMMARY

The disclosure provides a method and device for operating a mobile terminal based on a sensor, and a mobile terminal, so as to complete power-on/off, wakeup, sleep and other operations on the mobile terminal through the sensor, and bring better use experience to a user while making the structure of the mobile terminal simpler.

The disclosure provides a method for operating a mobile terminal based on a sensor, and the method includes:

the sensor is triggered according to a preset trigger rule to make the sensor output a digital signal corresponding to the trigger rule;

after receiving the digital signal which is corresponding to the trigger rule and is output from the sensor, an operation type, which is corresponding to the digital signal, of the mobile terminal is determined; and a corresponding operation process is performed on the mobile terminal according to the operation type.

Before triggering the sensor according to the preset trigger rule, the method may further include that:

according to a plurality of operation types of the mobile terminal, a plurality of trigger rules for triggering a sensor are preset.

The plurality of operation types of the mobile terminal may include at least one of the followings: power-on, power-off, wakeup, sleep and going to the main menu of system.

The trigger rule may include long press, click or double-click, wherein, an operation type, which is corresponding to the long press, of the mobile terminal is power-on or power-off;

an operation type, which is corresponding to the click, of the mobile terminal is going to the main menu of system; and an operation type, which is corresponding to the double-click, of the mobile terminal is wakeup and/or sleep.

After receiving the digital signal which is corresponding to the trigger rule and is output from the sensor, determining the operation type, which is corresponding to the digital signal, of the mobile terminal may include:

after receiving the digital signal, it is determined that the operation type of the mobile terminal is power-on or power-off if the trigger rule corresponding to the digital signal is long press;

if the trigger rule corresponding to the digital signal is click, it is determined that the operation type of the mobile terminal is going to the main menu of system; and if the trigger rule corresponding to the digital signal is double-click, it is determined that the operation type of the mobile terminal is wakeup or sleep.

The disclosure also provides a device for operating a mobile terminal based on a sensor, and the device includes:

a triggering component configured to trigger the sensor according a preset trigger rule to make the sensor output a digital signal corresponding to the trigger rule;

a determining component configured to, after receiving the digital signal which is corresponding to the trigger rule and is output from the sensor, determine the operation type, which is corresponding to the digital signal, of the mobile terminal; and an operating component configured to perform a corresponding operation process on the mobile terminal according to the operation type.

The device for operating the mobile terminal based on the sensor may further include:

a presetting component configured to preset, according to a plurality of operation types of the mobile terminal, a plurality of trigger rules for triggering a sensor.

The operation types of the mobile terminal may include at least one of the followings: power-on, power-off, wakeup, sleep and going to the main menu of system.

The plurality of trigger rules may include long press, click and double-click; wherein, an operation type, which is corresponding to the long press, of the mobile terminal is power-on or power-off;

an operation type, which is corresponding to the click, of the mobile terminal is going to the main menu of system; and an operation type, which is corresponding to the double-click, of the mobile terminal is wakeup and/or sleep.

The determining component may include:

a first determining unit configured to, after receiving the digital signal, determine that the operation type of the mobile terminal is power-on or power-off if the trigger rule corresponding to the digital signal is long press;

a second determining unit configured to, if the trigger rule corresponding to the digital signal is click, determine that the operation type of the mobile terminal is going to the main menu of system; and a third determining unit configured to, if the trigger rule corresponding to the digital signal is double-click, determine that the operation type of a mobile terminal is wakeup or sleep.

The disclosure further provides a mobile terminal, including the device for operating the mobile terminal based on the sensor; the device includes:

a triggering component configured to trigger the sensor according to a preset trigger rule to make the sensor output a digital signal corresponding to the trigger rule;

a determining component configured to, after receiving the digital signal which is corresponding to the trigger rule and is output from the sensor, determine the operation type, which is corresponding to the digital signal, of the mobile terminal; and an operating component configured to perform a corresponding operation process on the mobile terminal according to the operation type.

The disclosure adopts the sensor to replace a power-on/off button of a mobile terminal or a button for wakeup or sleep of the mobile terminal. Firstly, the sensor is triggered according to the preset trigger rule, and the sensor outputs the digital signal corresponding to the trigger rule; after the digital signal is received, the digital signal is detected to obtain the operation type of the mobile terminal corresponding to the determined digital signal, and a corresponding operation process is performed on a mobile terminal according to the obtained operation type. By adopting such solution, power-on/off, wakeup, sleep and other operations on the mobile terminal are completed through a sensor, so as to bring better use experience to a user while making the structure of the mobile terminal simpler.

The implementation of the aim, the function features and the advantages of the disclosure will be further illustrated in combination with the accompanying drawings and embodiments.

DETAILED DESCRIPTION OF THE EMBODIMENTS

It should be understood that specific embodiments described here are only used for illustrating the disclosure and not intended to limit the disclosure.

Figure 1:
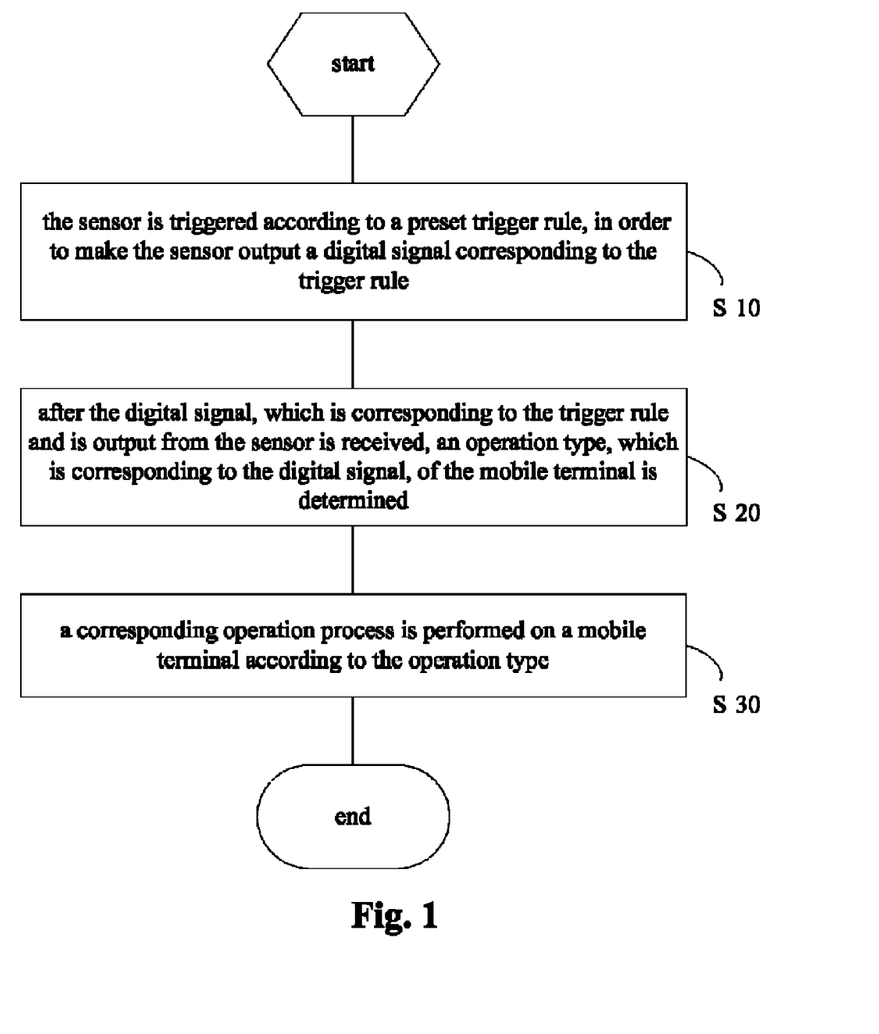
FIG. 1 is a flowchart of a method for operating a mobile terminal based on a sensor in an embodiment of the disclosure.

A method for operating a mobile terminal based on a sensor is provided in an embodiment of the disclosure. As shown in FIG. 1, the method includes the following steps.

S10: the sensor is triggered according to a preset trigger rule, in order to make the sensor output a digital signal corresponding to the trigger rule.

The method for operating the mobile terminal based on the sensor provided by the embodiment of the disclosure adopts a sensor to replace a power-on/off button in a mobile terminal or a button for wakeup or sleep of the mobile terminal, so as to implement a function of performing corresponding operation on a mobile terminal without any button. In this way, a system of mobile terminal, to which the method for operating the mobile terminal based on a sensor provided by the disclosure may be applied, may include a sensor, a battery, a Power Management Unit (PMU) and a Main Control Unit (MCU), wherein the battery is used for power supply of the PMU and the sensor; the sensor may be provided at any position on the screen of the mobile terminal; the sensor is connected to a pin of the PMU; after the PMU is triggered, it can supply power for the MCU, so as to maintain normal running of the MCU. At the same time, in the present embodiment, it is also needed to integrate in the system of mobile terminal a software processing module which is used for processing digital information output to the MCU by the sensor.

In the present embodiment, when the mobile terminal is operated according to the actual requirement of a user, firstly, the sensor is triggered according to the trigger rule preset in the system of mobile terminal. The trigger rule includes long press, click or double-click, and different trigger rules correspond to different operation types of the mobile terminal. After the sensor is triggered according to different trigger rules, a processing chip in the sensor converts analogue data corresponding to an trigger action into a digital signal corresponding to the trigger rule, and then outputs the digital signal. In the present embodiment, a pressure sensor may be adopted as the provided sensor. Because the sensor is connected to a pin of the PMU, the PMU may be triggered after the sensor is triggered, thus making a battery work for the PMU; at this point, the PMU powers the MCU on to maintain normal running of the MCU.

S20: after the digital signal, which is corresponding to the trigger rule and is output from the sensor is received, an operation type, which is corresponding to the digital signal, of the mobile terminal is determined.

After the digital signal, which is output from the sensor and obtained from conversion performed by a processing chip of the sensor according to the current trigger rule for triggering the sensor, is received, the digital signal is determined, so as to determine the operation type, which is corresponding to the digital signal, of the mobile terminal, and then to get which operation is needed to perform by a user on the mobile terminal now. In the present embodiment, the operation types of the mobile terminal may include: power-on, power-off, wakeup, sleep, going to the main menu of system, and so on; besides, the preset trigger rules for triggering the sensor corresponds to these operation types; that is, an operation type of the mobile terminal corresponding to the long press is power-on or power-off; an operation type of the mobile terminal corresponding to the click is going to the main menu of system; and an operation type of the mobile terminal corresponding to the double-click is wakeup and/or sleep.

S30: a corresponding operation process is performed on a mobile terminal according to the operation type.

After the operation type of the mobile terminal is determined according to the digital signal output from the sensor, it is needed to perform the corresponding operation process which is corresponding to the current operation type. That is, the mobile terminal is powered on or off; and after powering on, wakeup, sleep, going to the main menu and other operations are performed.

The method for operating the mobile terminal based on the sensor provided by the present embodiment adopts a sensor to replace a power-on/off button in a mobile terminal or a button for wakeup or sleep of the mobile terminal. Firstly, the sensor is triggered according to the preset trigger rule, and the sensor outputs the digital signal corresponding to the trigger rule; after the digital signal is received, the digital signal is detected to obtain the operation type, which is corresponding to the digital signal, of the mobile terminal, and the corresponding operation process is performed on the mobile terminal according to the operation type of the mobile terminal corresponding to the digital signal. By adopting this method, power-on/off, wakeup, sleep and other operations on the mobile terminal are completed through a sensor, so as to bring better use experience to a user while making the structure of the mobile terminal simpler.

Figure 2:
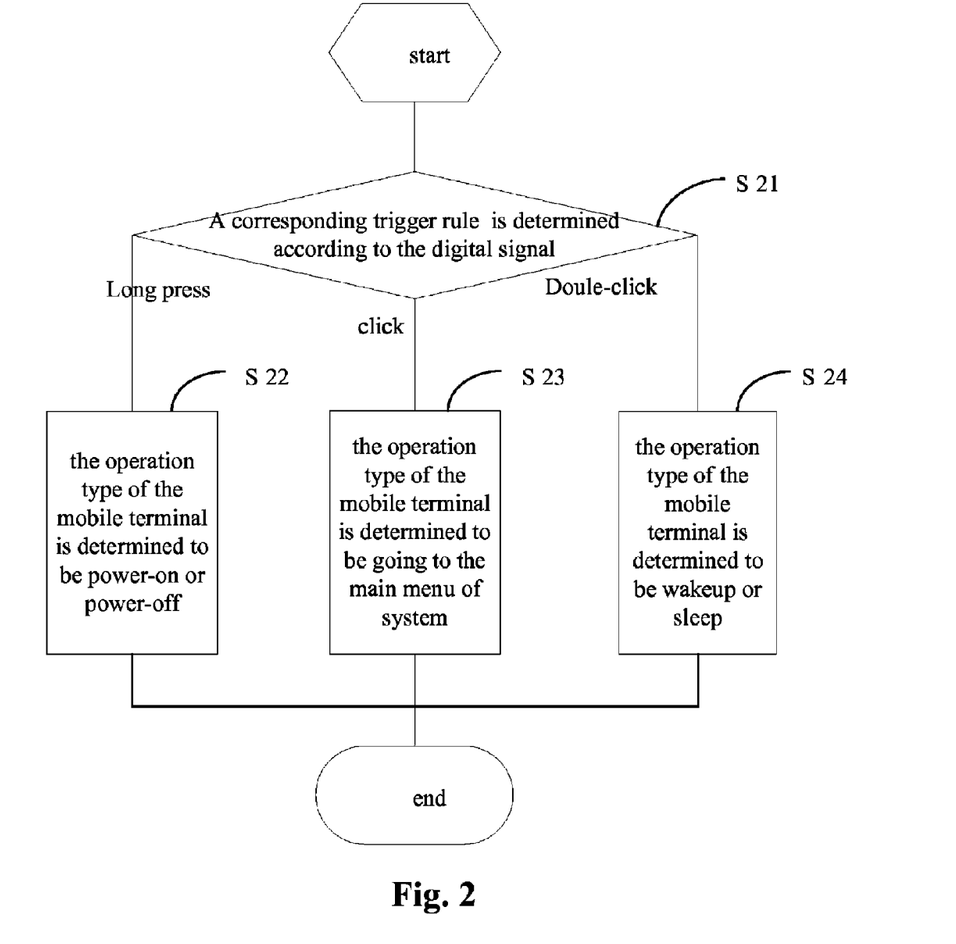
FIG. 2 is a flowchart of determining an operation type of a mobile terminal in a method for operating the mobile terminal based on a sensor according to an embodiment of the disclosure.

A method for operating a mobile terminal based on a sensor is provided in an embodiment of the disclosure. As shown in FIG. 2, the step S20 includes the following steps:

S21: after a digital signal is received, a trigger rule corresponding to the digital signal is determined according to the digital signal; if the trigger rule corresponding to the digital signal is long press, turn to the step S22; if the trigger rule corresponding to the digital signal is click, turn to the step S23; if the trigger rule corresponding to the digital signal is double-click, turn to the step S24;

S22: the operation type of the mobile terminal is determined to be power-on or power-off;

S23: the operation type of the mobile terminal is determined to be going to the main menu of system; and S24: the operation type of the mobile terminal is determined to be wakeup or sleep.

In the above embodiment, after the digital signal, which is corresponding to the trigger rule and is output from the sensor, is received, firstly, the trigger rule corresponding to the digital signal is determined according to the digital signal, and then the operation type of the mobile terminal is determined according to the trigger rule. If the trigger rule corresponding to the digital signal is long press, the operation type of the mobile terminal may be determined to be power-on or power-off. In this case, the MCU needs to further detect the digital signal to get whether the operation type corresponding to the digital signal is specifically power-on or power-off; if it is power-on, a software processing module which is integrated in the system and used for processing digital information is loaded, so as to enter a normal power-on process to start the mobile terminal; if it is power-off, the software processing module is released, so as to enter a normal power-off process to power the mobile terminal off.

After entering a power-on process by triggering the sensor and starting the mobile terminal, that is, the mobile terminal is in the power on state, a process for making the mobile terminal sleep or wakeup may also be performed on the mobile terminal. Therefore, if a digital signal is received at this point and the trigger rule corresponding to the digital signal is double-click, it may be determined that the operation type of the mobile terminal corresponding to the digital signal at this point is wakeup or sleep. Likewise, in this case, the MCU needs to further detect the digital signal to get whether the operation type corresponding to the digital signal is specifically wakeup or sleep; if it is wakeup, a wakeup process is performed to wake the mobile terminal up.

After the mobile terminal is woken up, if the sensor is triggered again, and a digital signal corresponding to a trigger signal is received, a software processing module used for processing the digital signal is needed to process the digital signal, that is, the operation type of the mobile terminal corresponding to the digital signal at this point is determined. If the trigger rule is click, the operation type of the mobile terminal corresponding to the digital signal at this point is going to the main menu, and the software processing module responses the operation type to return the main menu; if the trigger rule is double-click, the software processing module responses the operation type to make the mobile terminal enter a sleep state.

Of course, after the mobile terminal is woken up, the sensor may also be pressed long to make the mobile terminal power off. That is, at this point, the sensor may also output a digital signal corresponding to long press. Then, if the operation type of the mobile terminal corresponding to the digital signal is determined to be power-off through a software processing module, a normal power-off process is performed directly to power the mobile terminal off.

After the digital signal output from the sensor is received, the operation type corresponding to the digital signal is determined. The operation type of the mobile terminal corresponding to the trigger rule is determined according to different trigger rules for triggering the sensor, and a corresponding operation is performed on the mobile terminal according to the determined operation type. In this way, the process of completing power-on/off, wakeup, sleep and other operations on a mobile terminal through a sensor is further perfected, and better use experience is further brought to a user while further ensuring to make the structure of the mobile terminal simpler.

Figure 3:
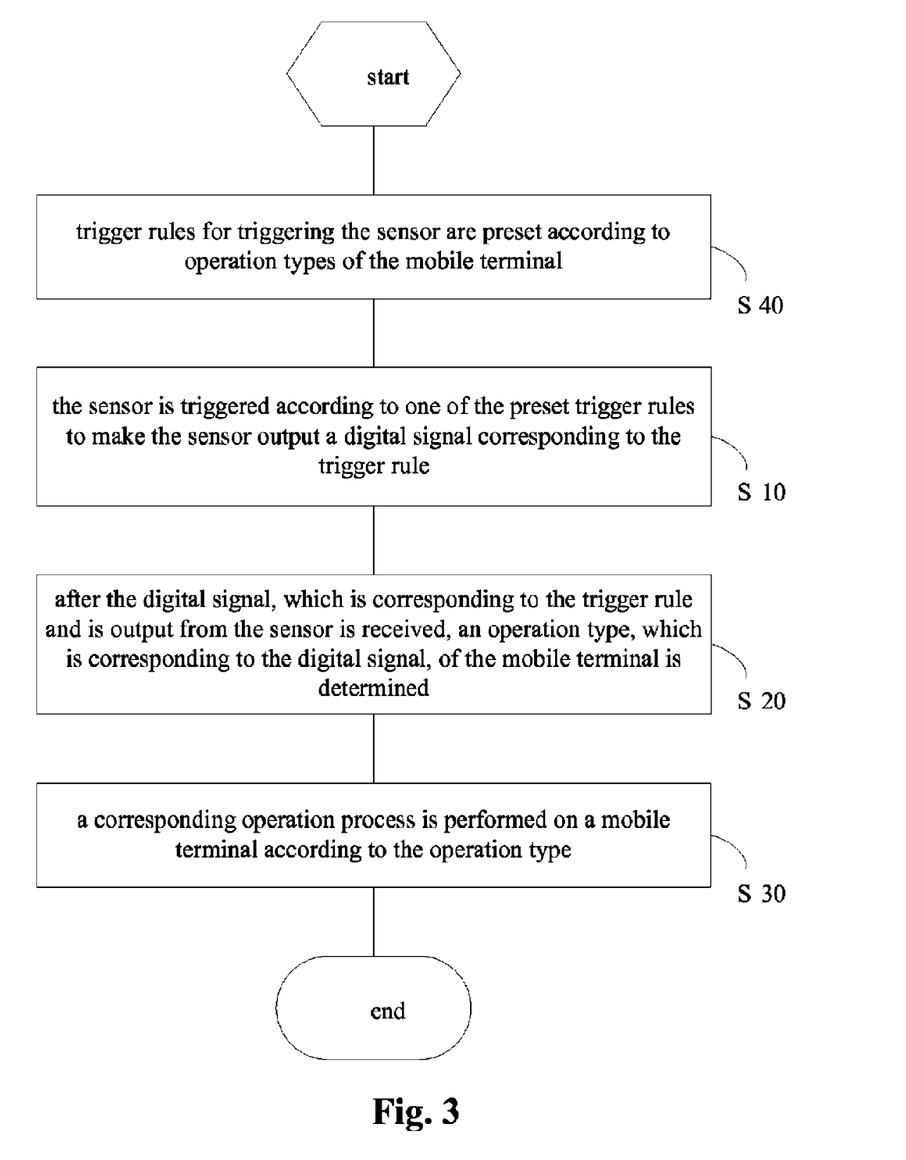
FIG. 3 is a flowchart of a method for operating a mobile terminal based on a sensor according to another embodiment of the disclosure.

As shown in FIG. 3, a method for operating a mobile terminal based on a sensor is provided according to another embodiment of the disclosure.

Before performing the step S10, the method further includes the following steps.

Step S40: trigger rules for triggering the sensor are preset according to operation types of the mobile terminal.

Because there are many different operation types of the mobile terminal, it is required the sensor to detect different operation types of the mobile terminal when the sensor is adopted to replace a button of the mobile terminal. In this way, before triggering the sensor, it is needed to preset in the system of mobile terminal the trigger rules, which are corresponding to the operation types, for triggering the sensor according to different operation types, wherein the trigger rules includes long press, click and double-click. After the sensor is triggered by using corresponding trigger rule according to the actual requirement of a user, the system of mobile terminal may identify the trigger rule, so as to determine the operation type corresponding to the trigger rule and complete the corresponding operation process.

The trigger rules for triggering the sensor are preset according to several different operation types of the mobile terminal, so that the trigger rule may be identified after triggering the sensor by using the corresponding trigger rule, and the corresponding operation type may be determined. In this way, a more powerful guarantee is provided for using the sensor to implement power-on/off, wakeup, sleep and other operations on the mobile terminal.

Figure 4:
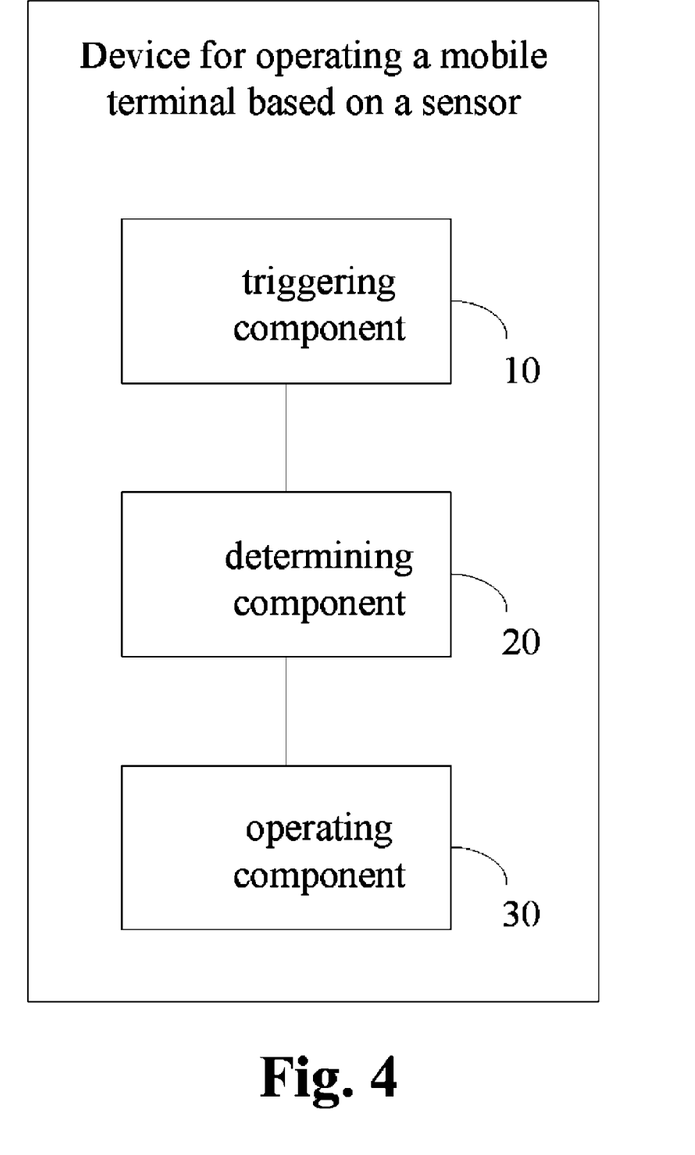
FIG. 4 is a structure diagram of a device for operating a mobile terminal based on a sensor according to an embodiment of the disclosure.

As shown in FIG. 4, a device for operating a mobile terminal based on a sensor is provided according to an embodiment of the disclosure and the device includes:

a triggering component 10 configured to trigger the sensor according to a preset trigger rule to make the sensor output a digital signal corresponding to the trigger rule;

a determining component 20 configured to, after receiving the digital signal which is corresponding to the trigger rule and is output from the sensor, determine an operation type, which is corresponding to the digital signal, for the mobile terminal; and an operating component 30 configured to perform a corresponding operation process on the mobile terminal according to the operation type.

The device for operating the mobile terminal based on the sensor provided by the present embodiment adopts the sensor to replace a power-on/off button of the mobile terminal or a button for wakeup or sleep of the mobile terminal, so as to implement a function of performing corresponding operation on the mobile terminal without any button. In this way, a system of mobile terminal to which the method for operating the mobile terminal based on the sensor provided by the disclosure can be applied may include a sensor, a battery, a PMU and an MCU. The battery is used for power supply of the PMU and the sensor. The sensor may be provided at any position on the screen of the mobile terminal. The sensor is connected to a pin of the PMU. After the PMU is triggered, the PMU may supply power for the MCU, so as to maintain normal running of the MCU. At the same time, in the present embodiment, it is also needed to integrate in the system of mobile terminal a software processing module which is used for processing digital information output to the MCU by the sensor.

In the present embodiment, when the mobile terminal is operated according to the actual requirement of the user, firstly, the sensor is triggered by the triggering component 10 according to the trigger rules preset in the system of mobile terminal. The trigger rules include long press, click and double-click; different trigger rules correspond to different operation types of the mobile terminal. After the sensor is triggered according to different trigger rules, a processing chip in the sensor converts corresponding analogue data of a trigger action into a digital signal corresponding to the trigger rule, and then outputs the digital signal. In the present embodiment, a pressure sensor may be adopted as the provided sensor. Because the sensor is connected to a pin of the PMU, the PMU may be triggered after the sensor is triggered, so as to make a battery supply power to the PMU. At this point, the PMU supply power to the MCU to maintain normal running of the MCU.

After the digital signal which is output from the sensor and obtained from conversion performed by a processing chip of the sensor according to the current trigger rule for triggering the sensor, the digital signal is detected by the determining component 20, so as to determine the operation type of the mobile terminal corresponding to the digital signal, and then to get which operation is needed to perform by the user on the mobile terminal now. In the present embodiment, the operation types of the mobile terminal may include: power-on, power-off, wakeup, sleep, going to the main menu of system, and so on; besides, the preset trigger rules for triggering the sensor corresponds to these operation types; that is, the operation type of the mobile terminal corresponding to the long press is power-on or power-off; the operation type of the mobile terminal corresponding to the click is going to the main menu of system; and the operation type of the mobile terminal corresponding to the double-click is wakeup and/or sleep.

After the operation type of the mobile terminal is determined according to the digital signal output from the sensor, the operating component 30 needs to perform a corresponding operation process according to the current operation type. That is, the mobile terminal is powered on or off; and after powering on, wakeup, sleep, going to the main menu and other operations may be performed.

The device for operating the mobile terminal based on the sensor provided by the present embodiment adopts the sensor to replace a power-on/off button of a mobile terminal or a button for wakeup or sleep of the mobile terminal. Firstly, the sensor is triggered according to the preset trigger rule, and the sensor outputs the digital signal corresponding to the trigger rule; after the digital signal is received, the digital signal is detected to obtain the operation type of the mobile terminal corresponding to the determined digital signal, and a corresponding operation process is performed on a mobile terminal according to the obtained the operation type. By adopting this method, power-on/off, wakeup, sleep and other operations on the mobile terminal are completed through the sensor, so as to bring better use experience to a user while making the structure of the mobile terminal simpler.

Figure 5:
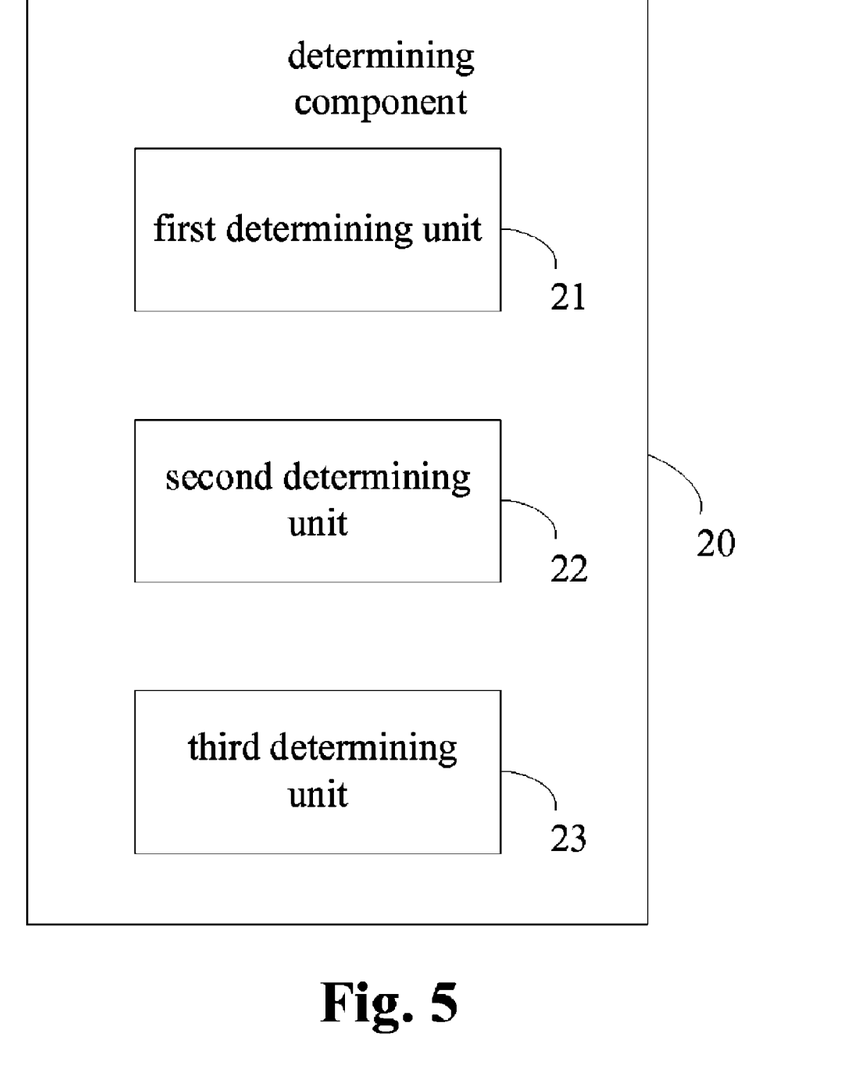
FIG. 5 is a structure diagram of a determining component of a device for operating a mobile terminal based on a sensor according to an embodiment of the disclosure.

A device for operating a mobile terminal based on a sensor is provided in an embodiment of the disclosure. As shown in FIG. 5, the determining component 20 specifically includes:

a first determining unit 21 configured to, if the trigger rule corresponding to the digital signal is long press, determine that the operation type of the mobile terminal is power-on or power-off;

a second determining unit 22 configured to, if the trigger rule corresponding to the digital signal is click, determine that the operation type of the mobile terminal is going to the main menu of system; and a third determining unit 23 configured to, if the trigger rule corresponding to the digital signal is double-click, determine that the operation type of the mobile terminal is wakeup or sleep.

In the above embodiment, after the digital signal which is corresponding to the trigger rule and is output from the sensor is received, firstly, the trigger rule corresponding to the digital signal is determined according to the digital signal, and then the operation type of the mobile terminal is determined according to the trigger rule. If the trigger rule corresponding to the digital signal is long press, the first determining unit 21 may determine that the operation type of the mobile terminal is power-on or power-off. In this case, the MCU needs to further detect the digital signal to get whether the operation type corresponding to the digital signal is specifically power-on or power-off; if it is power-on, a software processing module which is integrated in the system and used for processing digital information is loaded, so as to enter a normal power-on process to power on the mobile terminal; if it is power-off, the software processing module is released, so as to enter a normal power-off process to power the mobile terminal off.

After the mobile terminal enters a power-on process when the sensor is trigged and the mobile terminal is powered on, a process for making the mobile terminal sleep or wakeup may also be performed in a case that the mobile terminal is in a power-on state. Therefore, if the digital signal is received at this point and the trigger rule corresponding to the digital signal is double-click, the third determining unit 23 may determine that the operation type of the mobile terminal corresponding to the digital signal at this point is wakeup or sleep. Likewise, in this case, the MCU needs to further detect the digital signal to get whether the operation type corresponding to the digital signal is specifically wakeup or sleep; if it is wakeup, a wakeup process is performed to wake the mobile terminal up.

After the mobile terminal is woken up, if the sensor is triggered again, and a digital signal corresponding to a trigger signal is received, a software processing module used for processing the digital signal is needed to process the digital signal, that is, the operation type of the mobile terminal corresponding to the digital signal at this point is determined. If the trigger rule is click, the second determining unit 22 may determine that the operation type of the mobile terminal corresponding to the digital signal at this point is going to the main menu, and the software processing module responds by returning the main the menu; if the trigger rule is double-click, the software processing module responds by making the mobile terminal enter a sleep state.

Of course, after the mobile terminal is woken up, the sensor may also be pressed long to power the mobile terminal off. That is, at this point, the sensor may also output a digital signal corresponding to long press. Then, if an operation type of the mobile terminal corresponding to the digital signal is determined to be power-off through the software processing module, a normal power-off process to power the mobile terminal off is performed directly.

After the digital signal output from the sensor is received, the operation type corresponding to the digital signal is determined. The operation type of the mobile terminal corresponding to the trigger rule is determined according to different trigger rules for triggering the sensor, and a corresponding operation is performed on the mobile terminal according to the determined operation type. In this way, the process of completing power-on/off, wakeup, sleep and other operations on the mobile terminal through the sensor is further perfected, and better use experience is further brought to a user while further ensuring to make the structure of the mobile terminal simpler.

Figure 6:
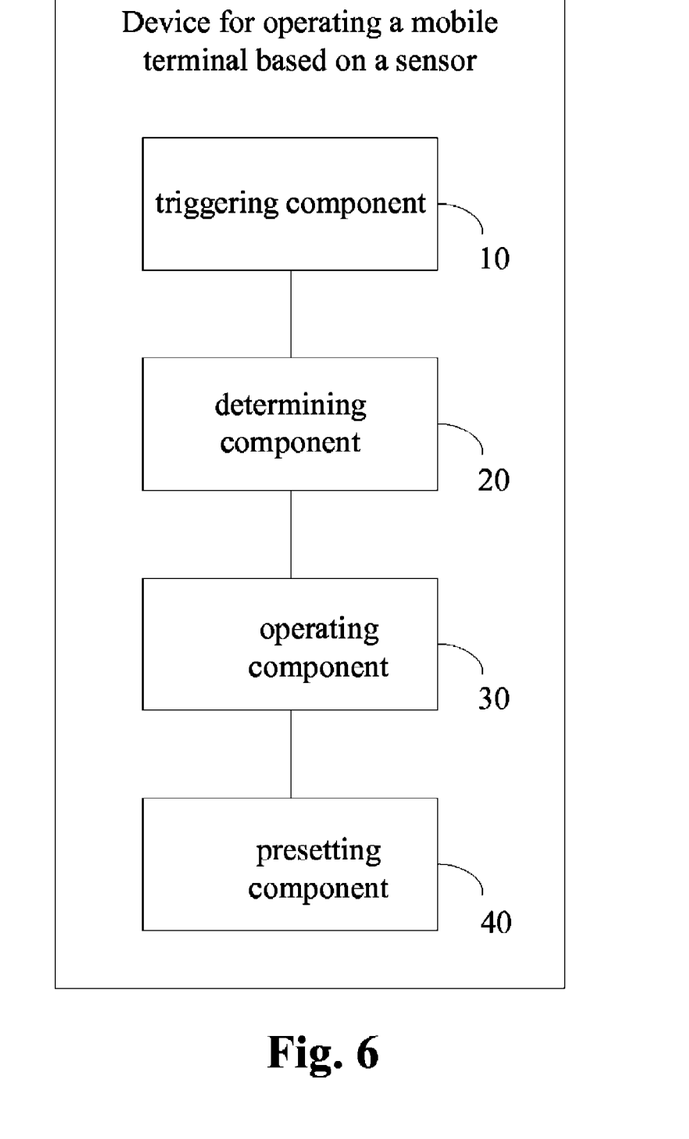
FIG. 6 is a structure diagram of a device for operating a mobile terminal based on a sensor according to another embodiment of the disclosure.

A device for operating a mobile terminal based on a sensor is provided in an embodiment of the disclosure. As shown in FIG. 6, the device further includes:

a presetting component 40 configured to preset, according to a plurality of operation types of the mobile terminal, trigger rules for triggering the sensor.

When the sensor is adopted to replace a button of the mobile terminal, because the mobile terminal includes several different operation types, it is required to adopt a sensor to detect different operation types of the mobile terminal. In this way, before triggering the sensor, the presetting component 40 needs to preset in the system of mobile terminal the trigger rules for triggering the sensor corresponding to the plurality of operation types according to different operation types, wherein the trigger rules includes long press, click and double-click. After the sensor is triggered by using corresponding trigger rule according to the actual requirement of a user, the system of mobile terminal may identify the trigger rule, so as to determine the operation type corresponding to the trigger rule and complete corresponding operation process.

The trigger rules for triggering the sensor is preset according to several different operation types of the mobile terminal, so that a trigger rule may be identified after the sensor is trigged by using corresponding trigger rule, and the corresponding operation type may be determined. In this way, a more powerful guarantee is provided for using the sensor to implement power-on/off, wakeup, sleep and other operations on the mobile terminal.

The embodiment of the disclosure further provides a mobile terminal, including a device for operating a mobile terminal based on a sensor; and the device includes:

a triggering component 10 configured to trigger a sensor according to a preset trigger rule to make the sensor output a digital signal corresponding to the trigger rule;

a determining component 20 configured to, after receiving the digital signal which is corresponding to the trigger rule and is output from the sensor, determine an operation type, which is corresponding to the digital signal, of the mobile terminal; and an operating component 30 configured to perform a corresponding operation process on the mobile terminal according to the operation type.

The embodiments of the mobile terminal include all technical solutions of the embodiments of the device for operating a mobile terminal based on a sensor shown in FIG. 4 to FIG. 6; and the achieved technical effects are the same, so it will not be repeated here.

The above is only the preferred embodiment of the disclosure and not intended to limit the scope of the claims of the disclosure; any equivalent replacements of structure or flow performed based on contents of the specification and accompanying drawings of the disclosure, or direct or indirect application of the equivalent replacements in other related technical fields shall fall within the scope of the claims of the disclosure.

What is claimed is:

1. A method for operating a mobile terminal based on a sensor, comprising:
   presetting a plurality of trigger rules for triggering the sensor according to a plurality of operation types of the mobile terminal;
   triggering the sensor according to one of the plurality of trigger rules to make the sensor output a digital signal corresponding to the trigger rule;
   determining an operation type, which is corresponding to the digital signal, of the mobile terminal, after receiving the digital signal which is corresponding to the trigger rule and is output from the sensor; and
   performing a corresponding operation process on the mobile terminal according to the operation type,
   wherein after receiving the digital signal which is corresponding to the trigger rule and is output from the sensor, determining the operation type, which is corresponding to the digital signal, of the mobile terminal comprises:
   determining that the operation type of the mobile terminal is power-on or power-off when the trigger rule corresponding to the digital signal is the long press, after receiving the digital signal;
   determining that the operation type of the mobile terminal is going to the main menu of system, when the trigger rule corresponding to the digital signal is the click; and
   determining that the operation type of the mobile terminal is wakeup or sleep, when the trigger rule corresponding to the digital signal is the double-click.

2. The method according to claim 1, wherein the plurality of operation types of the mobile terminal comprises at least one of the followings: power-on, power-off, wakeup, sleep and going to the main menu of system.

3. The method according to claim 2, wherein the plurality of trigger rules comprises a long press, a click and a double-click; wherein,
   an operation type, which is corresponding to the long press, of the mobile terminal is power-on or power-off;
   an operation type, which is corresponding to the click, of the mobile terminal is going to the main menu of system; and an operation type, which is corresponding to the double-click, of the mobile terminal is wakeup and/or sleep.

4. The method according to claim 3, wherein after receiving the digital signal which is corresponding to the trigger rule and is output from the sensor, determining the operation type, which is corresponding to the digital signal, of the mobile terminal comprises:
   determining that the operation type of the mobile terminal is power-on or power-off when the trigger rule corresponding to the digital signal is the long press, after receiving the digital signal;
   determining that the operation type of the mobile terminal is going to the main menu of system, when the trigger rule corresponding to the digital signal is the click; and
   determining that the operation type of the mobile terminal is wakeup or sleep, when the trigger rule corresponding to the digital signal is the double-click.

5. The method according to claim 2, wherein after receiving the digital signal which is corresponding to the trigger rule and is output from the sensor, determining the operation type, which is corresponding to the digital signal, of the mobile terminal comprises:
   determining that the operation type of the mobile terminal is power-on or power-off when the trigger rule corresponding to the digital signal is the long press, after receiving the digital signal;
   determining that the operation type of the mobile terminal is going to the main menu of system, when the trigger rule corresponding to the digital signal is the click; and
   determining that the operation type of the mobile terminal is wakeup or sleep, when the trigger rule corresponding to the digital signal is the double-click.

6. A device for operating a mobile terminal based on a sensor, comprising:
   a presetting component to preset a plurality of trigger rules for triggering the sensor according to a plurality of operation types of the mobile terminal;
   a triggering component to trigger a sensor according a preset trigger rule to make the sensor output a digital signal corresponding to the trigger rule;
   a determining component to, after receiving the digital signal which is corresponding to the trigger rule and is output from the sensor, determine an operation type, which is corresponding to the digital signal, of the mobile terminal; and
   an operating component to perform a corresponding operation process on the mobile terminal according to the operation type,
   wherein the determining component comprises:
   a first determining unit to-determine that the operation type of the mobile terminal is power-on or power-off when the trigger rule corresponding to the digital signal is the long press, after receiving the digital signal;
   a second determining unit to determine that the operation type of the mobile terminal is going to the main menu of system, when the trigger rule corresponding to the digital signal is the click; and
   a third determining unit determine that the operation type of the mobile terminal is wakeup or sleep, when the trigger rule corresponding to the digital signal is the double-click.

7. The device according to claim 6, wherein the operation types of the mobile terminal comprise at least one of the followings: power-on, power-off, wakeup, sleep and going to the main menu of system.

8. The device according to claim 7, wherein the plurality of trigger rules comprises: a long press, a click and a double-click; wherein,
   an operation type, which is corresponding to the long press, of the mobile terminal is power-on or power-off;
   an operation type, which is corresponding to the click, of the mobile terminal is going to the main menu of system; and
   an operation type, which is corresponding to the double-click, of the mobile terminal is wakeup and/or sleep.

9. The device according to claim 7, wherein the determining component comprises:
   a first determining unit to-determine that the operation type of the mobile terminal is power-on or power-off when the trigger rule corresponding to the digital signal is the long press, after receiving the digital signal;
   a second determining unit to determine that the operation type of the mobile terminal is going to the main menu of system, when the trigger rule corresponding to the digital signal is the click; and
   a third determining unit to determine that the operation type of the mobile terminal is wakeup or sleep, when the trigger rule corresponding to the digital signal is the double-click.

10. A mobile terminal, comprising the device for operating the mobile terminal based on the sensor according to claim 6.

11. A mobile terminal, comprising the device for operating the mobile terminal based on the sensor according to claim 7.

12. A mobile terminal, comprising the device for operating the mobile terminal based on the sensor according to claim 8.

* * * * *